(12) United States Patent
Lee et al.

(10) Patent No.: US 11,578,849 B2
(45) Date of Patent: Feb. 14, 2023

(54) LAMP FOR VEHICLE

(71) Applicant: SL Corporation, Daegu (KR)

(72) Inventors: Jeong Su Lee, Gyeongsan-si (KR); Jong Woon Kim, Gyeongsan-si (KR)

(73) Assignee: SL Corporation, Daegu (KR)

(*) Notice: Subject to any disclaimer, the term of this patent is extended or adjusted under 35 U.S.C. 154(b) by 56 days.

(21) Appl. No.: 17/358,705

(22) Filed: Jun. 25, 2021

(65) Prior Publication Data

US 2022/0034465 A1 Feb. 3, 2022

(30) Foreign Application Priority Data

Jul. 29, 2020 (KR) .................. 10-2020-0094622

(51) Int. Cl.
| | |
|---|---|
| *G02B 3/00* | (2006.01) |
| *F21S 41/265* | (2018.01) |
| *F21S 41/275* | (2018.01) |
| *F21V 5/00* | (2018.01) |
| *F21S 41/43* | (2018.01) |
| *F21W 107/10* | (2018.01) |

(52) U.S. Cl.
CPC .......... *F21S 41/275* (2018.01); *F21S 41/265* (2018.01); *F21S 41/43* (2018.01); *F21V 5/004* (2013.01); *G02B 3/0056* (2013.01); *G02B 3/0062* (2013.01); *F21W 2107/10* (2018.01)

(58) Field of Classification Search
CPC .... G02B 3/0043; G02B 3/005; G02B 3/0056; G02B 3/0062; G02B 3/0068; F21S 41/265
See application file for complete search history.

(56) References Cited

U.S. PATENT DOCUMENTS

| 10,962,191 B1 | 3/2021 | Go et al. |
| 2016/0265733 A1 | 9/2016 | Bauer et al. |
| 2018/0149336 A1* | 5/2018 | Tsai ...................... F21S 41/151 |

FOREIGN PATENT DOCUMENTS

| AT | 514967 A1 | 5/2015 |
| DE | 10 2020 213 531 A1 | 5/2021 |

* cited by examiner

*Primary Examiner* — Sean P Gramling
(74) *Attorney, Agent, or Firm* — United One Law Group LLC; Kongsik Kim; Jhongwoo Peck

(57) ABSTRACT

Provided is a lamp for a vehicle capable of achieving uniform brightness while improving sharpness of a light irradiation pattern. The vehicle lamp includes a light source system; and an optical system configured to allow light emitted from the light source system to be incident to the optical system through a plurality of incident lenses and to exit through a plurality of exit lenses corresponding to the plurality of incident lenses. The plurality of exit lenses include a first exit lens configured to output light therefrom in a first direction, and a second exit lens configured to output light therefrom in a second direction that is tilted by a predetermined angle with respect to the first direction.

16 Claims, 13 Drawing Sheets

LAMP FOR VEHICLE

CROSS-REFERENCE TO RELATED APPLICATION

This application claims priority to Korean Patent Application No. 10-2020-0094622 filed on Jul. 29, 2020, which application is incorporated herein by reference in its entirety.

BACKGROUND

1. Technical Field

The present disclosure relates to a lamp for a vehicle, and more particularly, to a lamp for a vehicle capable of achieving uniform brightness while improving sharpness of a light irradiation pattern.

2. Description of Related Art

A vehicle is equipped with various types of lamps having an illumination function to easily identify objects located around the vehicle during low-light conditions (e.g., night driving), and a signaling function to inform a driver of another vehicle or a pedestrian around the vehicle of a driving state of the vehicle.

For example, head lamps and fog lamps are mainly intended for illumination functions. Turn signal lamps, tail lamps, brake lamps, and the like are mainly for signaling functions. Installation standards and requirements of the lamps are stipulated by laws and regulations to fully exhibit corresponding functions.

Recently, research has been actively conducted to reduce a size of a lamp using a plurality of micro-lenses having a relatively short focal length. In this case, a light irradiation pattern having a required size or brightness is formed using light beams exiting from the plurality of micro-lenses. A plurality of shields are provided to block some of light beams traveling to the plurality of micro-lenses according to a shape of the light irradiation pattern.

In this regard, when the light irradiation pattern is formed by light beams exiting from the plurality of micro-lenses, light irradiation patterns of the light beams exiting from the plurality of micro-lenses may not be superposed on one another but may be misaligned from one another due to the differences between positions of the plurality of micro-lenses. In this case, the light irradiation pattern does not have generally uniform brightness, thus leading to possibility of a deteriorated vision and a sense of heterogeneity.

Accordingly, there is a need for a method of allowing the light beams exiting from the plurality of micro-lenses to be superposed on one another without being misaligned from one another to improve a sharpness of the light irradiation pattern and to achieve uniform brightness.

SUMMARY

Aspects of present disclosure provide a lamp for a vehicle in which light beams exiting from a plurality of micro-lenses are superposed on one another without being misaligned from one another, thereby improving a sharpness of a light irradiation pattern and achieving uniform brightness.

Objects of the present disclosure are not limited to the above-mentioned objects. Other objects and advantages in accordance with the present disclosure not mentioned above may be understood from following descriptions and more clearly understood from embodiments in accordance with the present disclosure. Further, it will be readily appreciated that the objects and advantages in accordance with the present disclosure may be realized by features and combinations thereof as disclosed in the claims.

According to an aspect of the present disclosure, a vehicle lamp may include a light source system; and an optical system to allow light emitted from the light source system to be incident to the optical system through a plurality of incident lenses and to exit through a plurality of exit lenses corresponding to the plurality of incident lenses. In particular, the plurality of exit lenses may include a first exit lens configured to output light therefrom in a first direction; and a second exit lens configured to output light therefrom in a second direction, which is tilted by a predetermined angle with respect to the first direction.

The optical system may comprise a first optical member having an incident surface for receiving the light from the light source system, where the plurality of incident lenses are arranged on the incident surface. The optical system may further comprise a second optical member having an exit surface from which the light incident from the first optical member exits, where the plurality of exit lenses are arranged on the exit surface. The exit surface of the second optical member may be formed in a planar shape.

An exit surface of the first exit lens may be symmetrical with respect to a reference line that passes through a center of an incident surface of the first exit lens in a perpendicular direction to the exit surface of the second optical member. An exit surface of the second exit lens may be asymmetrical with respect to a reference line that passes through a center of an incident surface of the second exit lens in the perpendicular direction to the exit surface of the second optical member.

The second exit lens may comprise a plurality of second exit lenses, wherein exit surfaces of the plurality of second exit lenses have different curvatures, based on distances between the plurality of second exit lenses and the first exit lens.

The exit surface of the second optical member may have a first surface on which the first exit lens is formed, and a second surface on which the second exit lens is formed. The second surface may be tilted by a predetermined angle with respect to the first surface.

An exit surface of the first exit lens may be symmetrical with respect to a reference line that passes through a center of an incident surface of the first exit lens in a perpendicular direction to the exit surface of the second optical member. An exit surface of the second exit lens may be symmetrical with respect to a reference line that passes through a center of an incident surface of the second exit lens in the perpendicular direction to the exit surface of the second optical member.

The second exit lens may comprise a plurality of second exit lenses, and the exit surface of the second optical member may have a plurality of surfaces on which a plurality of the second exit lenses are respectively formed. The plurality of surfaces may have different tilt angles with respect to the first surface, based on distances between the plurality of second exit lenses and the first exit lens.

The first exit lens may be a central exit lens among the plurality of exit lenses, and a direction in which light exits from the second exit lens may be tilted toward the first exit lens.

The light source system may comprise a light source; and an optical path adjustment member for adjusting a path of the light emitted from the light source. The optical path adjustment member may adjust the path of the light to cause the light emitted from the light source system to be substantially parallel to an optical axis of the light source. The optical path adjustment member may comprise at least one of an aspherical lens, a total internal reflection (TIR) lens, a reflector, or a Fresnel lens.

The lamp for the vehicle according to the present disclosure as described above has one or more of following effects. The light irradiation patterns of light beams respectively exiting from the plurality of exit lenses may be prevented from being misaligned from one another but may be superposed on one another by tilting a direction in which a light beam exits from at least one of the plurality of exit lenses, based on a position where the light irradiation pattern is formed. Therefore, the sharpness of the light irradiation pattern may be improved, and the uniform brightness may be achieved.

In addition to the effects as described above, specific effects in accordance with the present disclosure will be described together with the detailed description set forth below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTIONS

Figure 1:
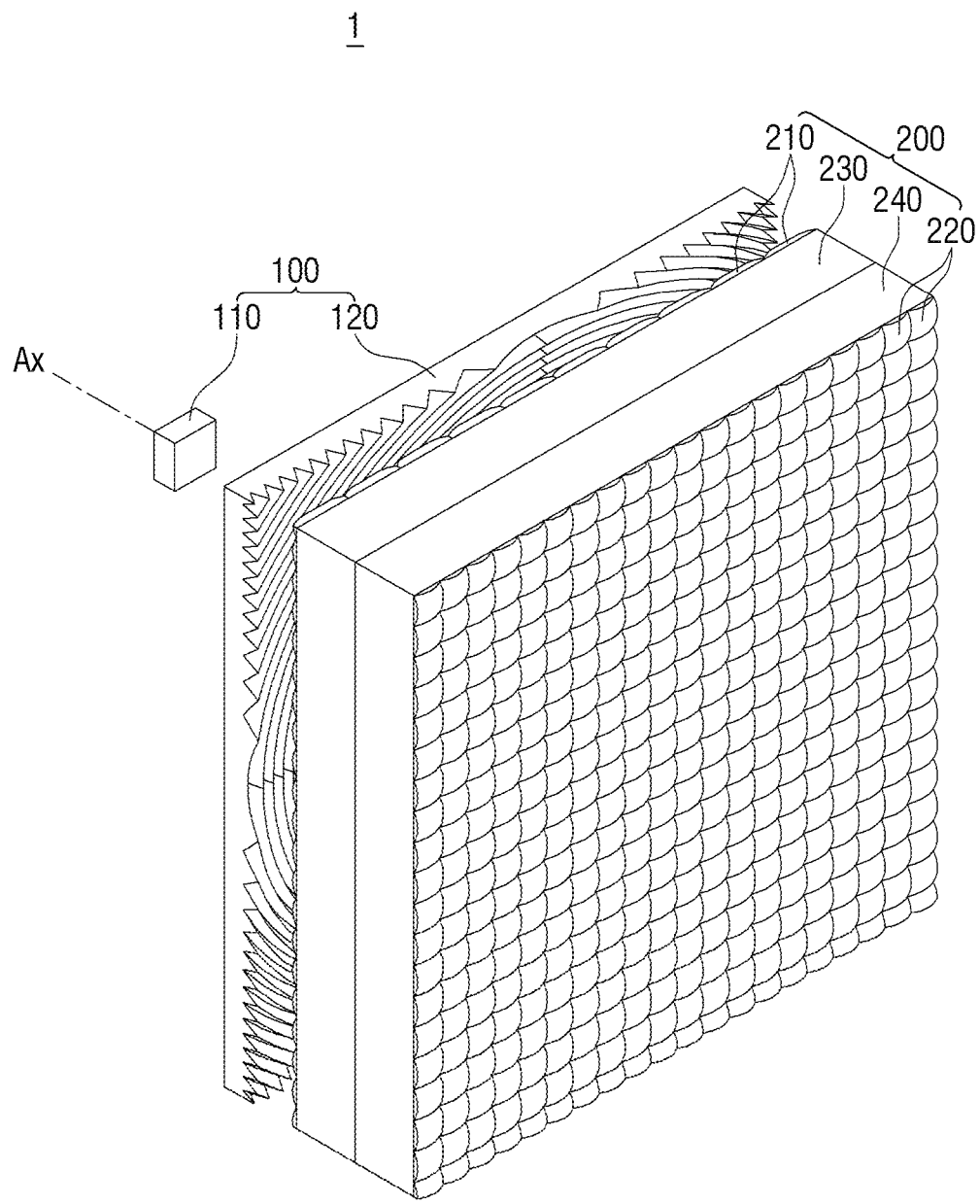
FIGS. 1 and 2 are perspective views showing a lamp for a vehicle according to an exemplary embodiment of the present disclosure.

Advantages and features of the present invention and methods of accomplishing the same may be understood more readily by referring to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to drawings for describing a lamp for a vehicle based on exemplary embodiments of the present disclosure.

Figure 2:
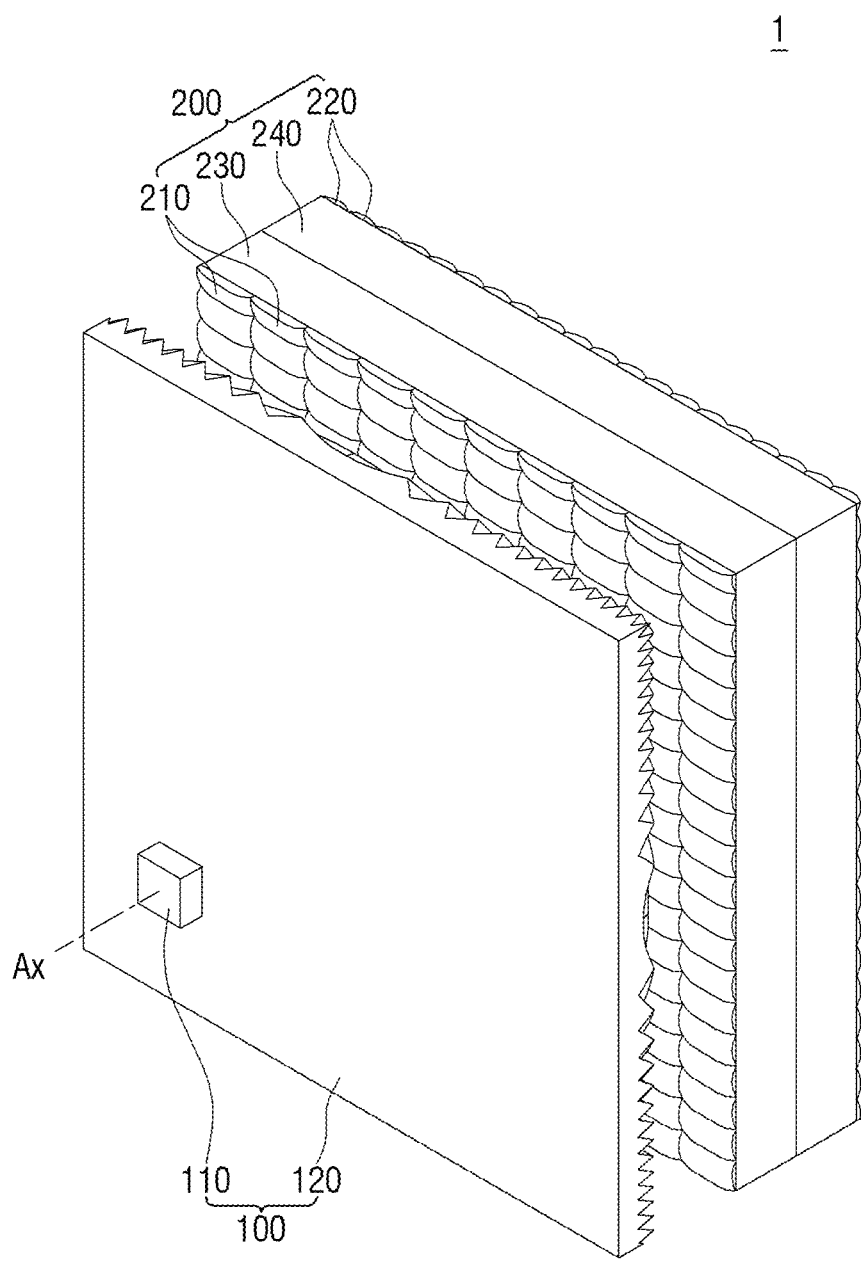
Figure 3:
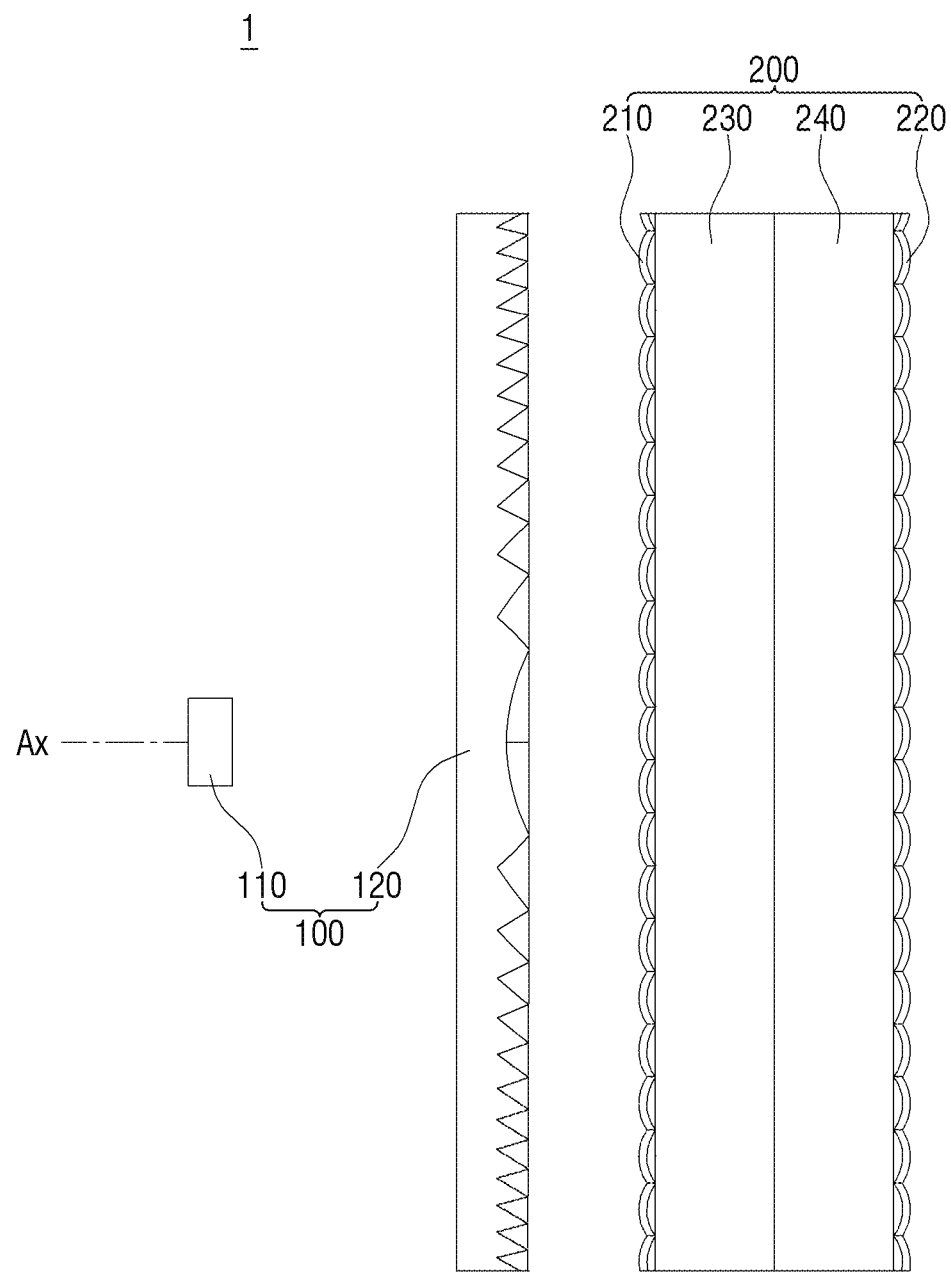
FIG. 3 is a side view showing a lamp for a vehicle according to an exemplary embodiment of the present disclosure.
Figure 4:
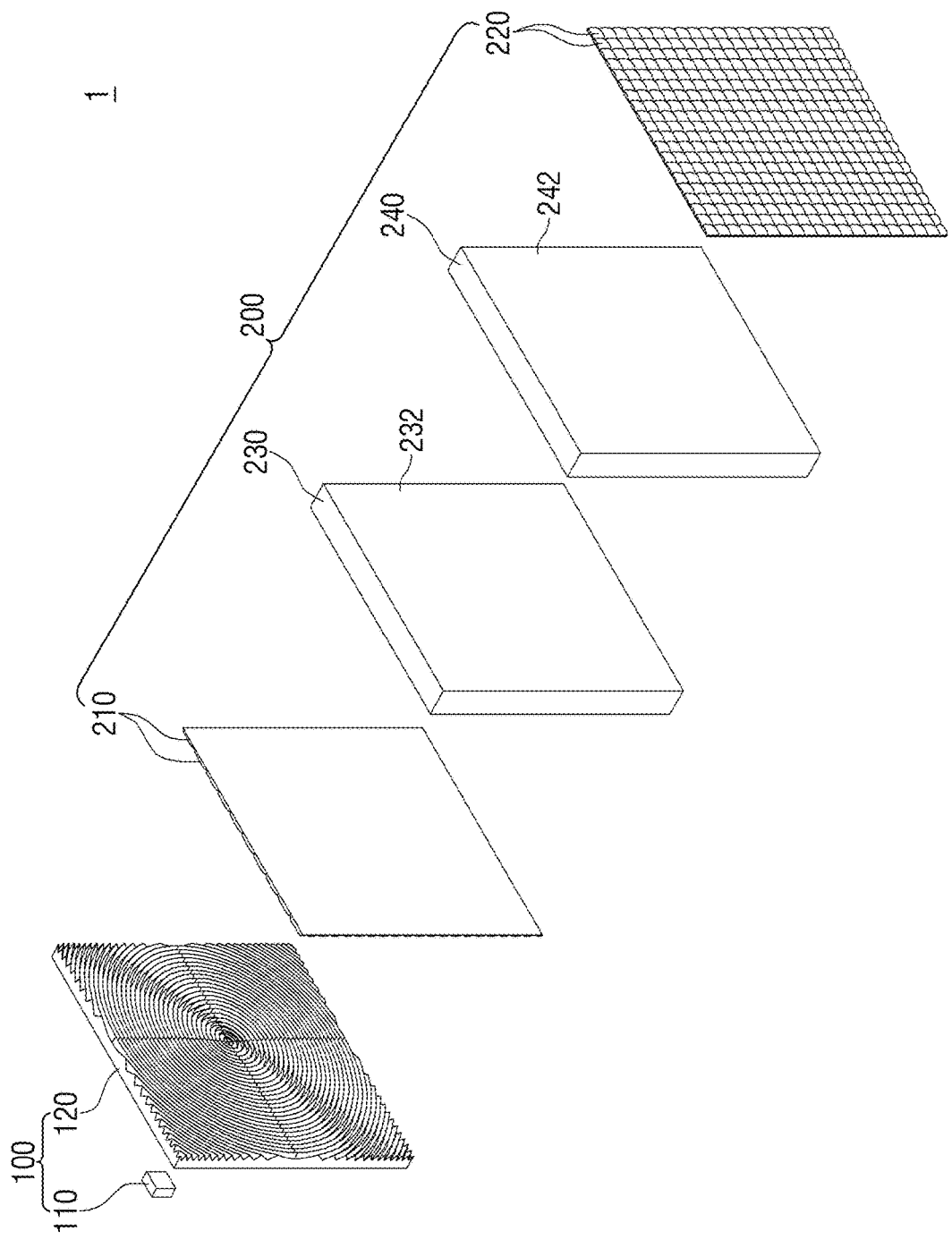
FIGS. 4 and 5 are exploded perspective views showing a lamp for a vehicle according to an exemplary embodiment of the present disclosure.
Figure 5:
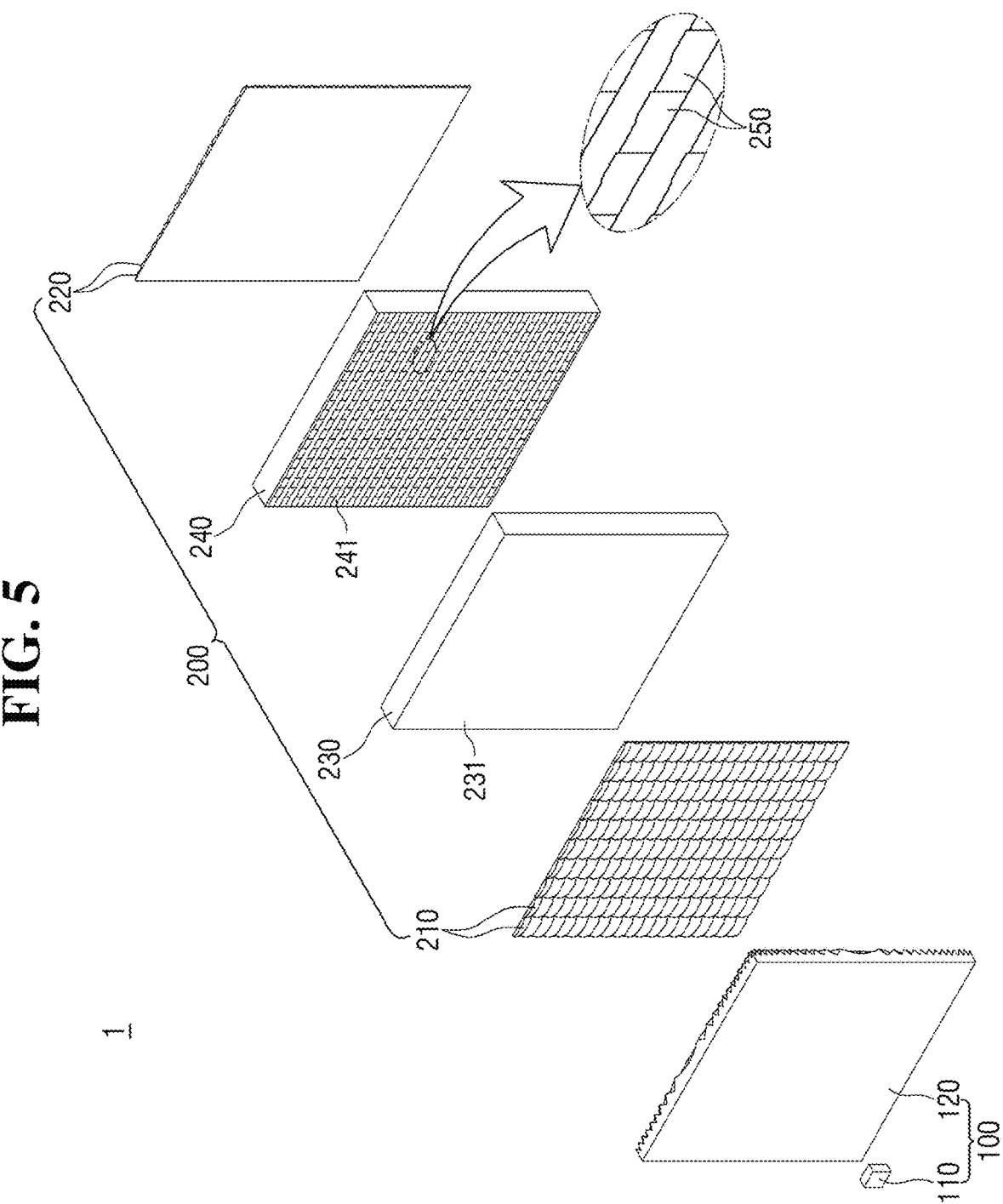

FIGS. 1 and 2 are perspective views showing a lamp for a vehicle according to an exemplary embodiment of the present disclosure. FIG. 3 is a side view showing a lamp for a vehicle according to an exemplary embodiment of the present disclosure. FIGS. 4 and 5 are exploded perspective views showing a lamp for a vehicle according to an exemplary embodiment of the present disclosure.

Referring to FIGS. 1 to 5, a lamp 1 for a vehicle according to an exemplary embodiment of the present disclosure may include a light source system 100 and an optical system 200. The light source system 100 and the optical system 200 may be housed in an interior space defined by a lamp housing (not shown) and a cover lens (not shown) that is coupled to the lamp housing to irradiate light to outside of the vehicle.

In an exemplary embodiment of the present disclosure, the lamp 1 for the vehicle may have a variety of functions including an illumination function such as a function of a head lamp that ensures a driver's field of view when driving the vehicle in low-light conditions such as at night, a signaling function such as a function of a position lamp, a daytime running lamp, a turn signal lamp, a brake lamp, and the like that informs another driver or a pedestrian of the driving state of the vehicle, and a function to display an image representing various information that drivers of nearby vehicles or pedestrians need to recognize on a road surface around the vehicle. The lamp 1 for the vehicle according to the present disclosure may have a single function among the above-described functions, or may have a combination of at least two functions.

The light source system 100 may include a light source 110 and an optical path adjustment member 120. In an exemplary embodiment of the present disclosure, the light source 110 may be embodied as a semiconductor light emission device such as a light emitting diode (LED). However, the present disclosure is not limited thereto, and the light source 110 may be embodied not only as the semiconductor light emission device, but also as various types of light sources such as a bulb and a laser diode (LD). Optical elements such as lenses, mirrors, prisms, and reflectors that affect light properties such as a path or brightness of the light emitted from the light source 110 may be additionally used, depending on a type or the number of the light sources 110.

The optical path adjustment member 120 may adjust a light path such that the light emitted from the light source 110 having a predetermined light irradiation angle with respective to an optical axis Ax of the light source 110 may travel in parallel to the optical axis Ax of the light source 110 and may be incident onto the optical system 200. The optical axis Ax of light source 110 may be defined as a line that is perpendicular to a center of an emission plane of the light source 110. The optical axis Ax of light source 110 may be defined as the optical axis of light source system 100.

The optical path adjustment member 120 may allow the light emitted from the light source 110 to be incident to the optical system 200 with a minimal loss to improve the light efficiency. Further, the optical path adjustment member 120 may adjust a light path such that the light is incident to the optical system 200 in parallel to the optical axis Ax of the light source 110. Accordingly, the light emitted from the light source 110 may be generally uniformly incident onto the optical system 200, and thus an entire area onto which the lamp 1 for the vehicle according to the present disclosure may irradiate light having uniform brightness.

In an exemplary embodiment of the present disclosure, a Fresnel lens including several annular lenses may be used as the optical path adjustment member 120, and the light path of the light emitted from the light source 110 may be adjusted to be parallel to the optical axis Ax of light source 110 while reducing a thickness of the optical path adjustment member 120. However, the present disclosure is not limited thereto. The optical path adjustment member 120 may be embodied as various types of collimator lenses or reflectors such as aspherical lenses and total internal reflection (TIR) lenses that may adjust the path of the light emitted from the light source 110.

The optical system 200 may be disposed in front of the light source system 100 and may allow the light incident thereto from the light source system 100 to exit forward, such that the light irradiated from the lamp 1 for the vehicle according to the present disclosure forms a light irradiation pattern suitable for the function of the lamp 1 for the vehicle according to the present disclosure.

The optical system 200 may include a plurality of incident lenses 210 onto which the light from the light source system 100 is incident, and a plurality of exit lenses 220 from which light incident thereto from the plurality of incident lenses 210 exits. In an exemplary embodiment of the present disclosure, each of the incident lenses 210 and the exit lenses 220 may be embodied as a micro-lens having a relatively short focal length for miniaturization of the lamp 1 for the vehicle according to the present disclosure.

The plurality of incident lenses 210 may be disposed on an incident surface 231 of a first optical member 230 onto which the light from the light source system 100 is incident. The plurality of exit lenses 220 may be disposed on an exit surface 242 of a second optical member 240 disposed in front of the first optical member 230. An exit surface 232 of the first optical member 230 and an incident surface 241 of the second optical member 240 may face each other. Each of the first optical member 230 and the second optical member 240 may be made of a material such as glass that is capable of transmitting light.

In an exemplary embodiment of the present disclosure, a case in which the plurality of incident lenses 210 and the plurality of exit lenses 220 are respectively formed on the first optical member 230 and the second optical member 240 arranged in a front-and-rear direction is described by way of example. This configuration is intended such that a plurality of shields 250 may be disposed between the plurality of incident lenses 210 and the plurality of exit lenses 220 for blocking or obstructing some of light beams that respectively proceed to the plurality of exit lenses 220 to form a light irradiation pattern having a shape suitable for the function of the lamp 1 for the vehicle according to the present disclosure. When the plurality of shields 250 are omitted, the first optical member 230 and the second optical member 240 may be integrally formed with each other.

Further, in an exemplary embodiment of the present disclosure, a case where the exit surface 232 of the first optical member 230 and the incident surface 241 of the second optical member 240 are disposed so as to contact each other will be described by way of example. However, the present disclosure is not limited thereto. The first optical member 230 and the second optical member 240 may be spaced apart from each other by a predetermined distance to allow light diffusion.

The plurality of shields 250 may block some of light beams that respectively proceed to the plurality of exit lenses 220 based on the shape of the light irradiation pattern formed by the lamp 1 for the vehicle according to the present disclosure. In an exemplary embodiment of the present disclosure, a case in which the plurality of shields 250 are formed on the incident surface 241 of the second optical member 240 is described by way of example. However, the present disclosure is not limited thereto. The plurality of shields 250 may be formed on a surface of at least one of the first optical member 230 or the second optical member 240 based on a focal position between the plurality of incident lenses 210 and the plurality of exit lenses 220 corresponding to the plurality of incident lenses 210.

Further, in an exemplary embodiment of the present disclosure, a case in which the plurality of shields 250 are respectively disposed between the plurality of incident lenses 210 and the plurality of exit lenses 220 corresponding to the plurality of incident lenses 210 is described by way of an example. However, the present disclosure is not limited thereto. At least two shields may be disposed, along the front-and-rear direction, between the plurality of incident lenses 210 and the plurality of exit lenses 220 corresponding to the plurality of incident lenses 210, based on the function and/or the light irradiation pattern of the lamp 1 for the vehicle according to the present disclosure.

FIGS. 1 to 5 show an example that the plurality of shields 250 form a low beam pattern in which light is irradiated onto an area below a predetermined cut-off line so that glare does not occur to a driver of a proceeding vehicle or an oncoming vehicle. However, the present disclosure is not limited thereto. The plurality of shields 250 may have various shapes depending on the function of the lamp 1 for the vehicle according to the present disclosure or the shape of the light irradiation pattern formed by the lamp 1 for the vehicle according to the present disclosure.

According to an exemplary embodiment of the present disclosure, each of the plurality of incident lenses 210 may exhibit a semi-cylindrical shape that extends in a left-and-right direction, and accordingly, a light beam exiting from one of the plurality of incident lenses 210 may be incident to several exit lenses arranged in the left-and-right direction among the plurality of exit lenses 220. However, the present disclosure is not limited thereto. Based on a size, a shape, and brightness of the light irradiation pattern formed by the lamp 1 for the vehicle according to the present disclosure, the plurality of incident lenses 210 and the plurality of exit lenses 220 may correspond to each other in one-to-one, one-to-many, many-to-one, many-to-many, etc.

Figure 6:
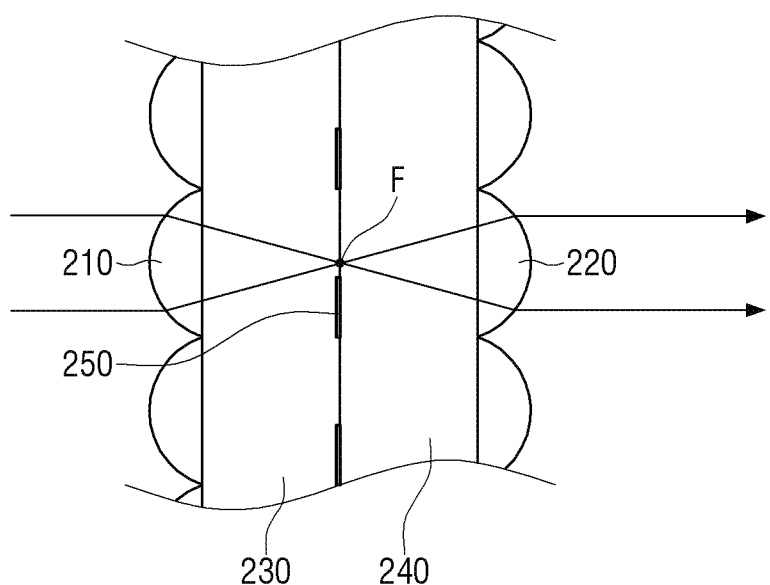
FIG. 6 is a schematic diagram showing a light path of a lamp for a vehicle according to an exemplary embodiment of the present disclosure.

In the lamp 1 for the vehicle according to the present disclosure, as shown in FIG. 6, the light emitted from the light source system 100 may be incident onto the optical system 200 in parallel to the optical axis Ax of the light source system 100. Subsequently, the light incident on the optical system 200 may pass through a focal point F disposed between the plurality of incident lenses 210 and the plurality of exit lenses 220 corresponding to the plurality of incident lenses 210, and then may exit through the plurality of exit lenses 220 in parallel to the optical axis Ax of the light source system 100 to forms the light irradiation pattern suitable for the function of the lamp 1 for the vehicle according to the present disclosure.

In this regard, the lamp 1 for the vehicle according to the present disclosure may allow light irradiation patterns of light beams respectively exiting from the plurality of exit lenses 220 to be superposed on one another to form the light irradiation pattern having a size or brightness suitable for the function of the lamp 1 for the vehicle according to the present disclosure. In other words, the light irradiation patterns of light beams respectively exiting from the plurality of exit lenses 220 may be superposed on one another so as not to be misaligned from one another, such that the light irradiation pattern formed by the lamp 1 for the vehicle according to the present disclosure may have sharpness and uniform brightness.

For example, when the lamp 1 for the vehicle according to the present disclosure achieves an illumination function such as a low beam pattern or a high beam pattern, the light irradiation patterns of some light beams among the light beams exiting from the plurality of exit lenses 220 may be misaligned from the light irradiation patterns of other beams among the light beams exiting from the plurality of exit lenses 220. In such case, a luminous intensity may become relatively low, the vision may be deteriorated, and a sense of heterogeneity may occur. Further, when the lamp 1 for the vehicle according to the present disclosure achieves a function of displaying a predetermined image on a road surface around the vehicle, the sharpness of the image may be degraded. Thus, it is necessary to superpose the light irradiation patterns of light beams exiting from the plurality of exit lenses 220 so as not to be misaligned from one another.

Figure 7:
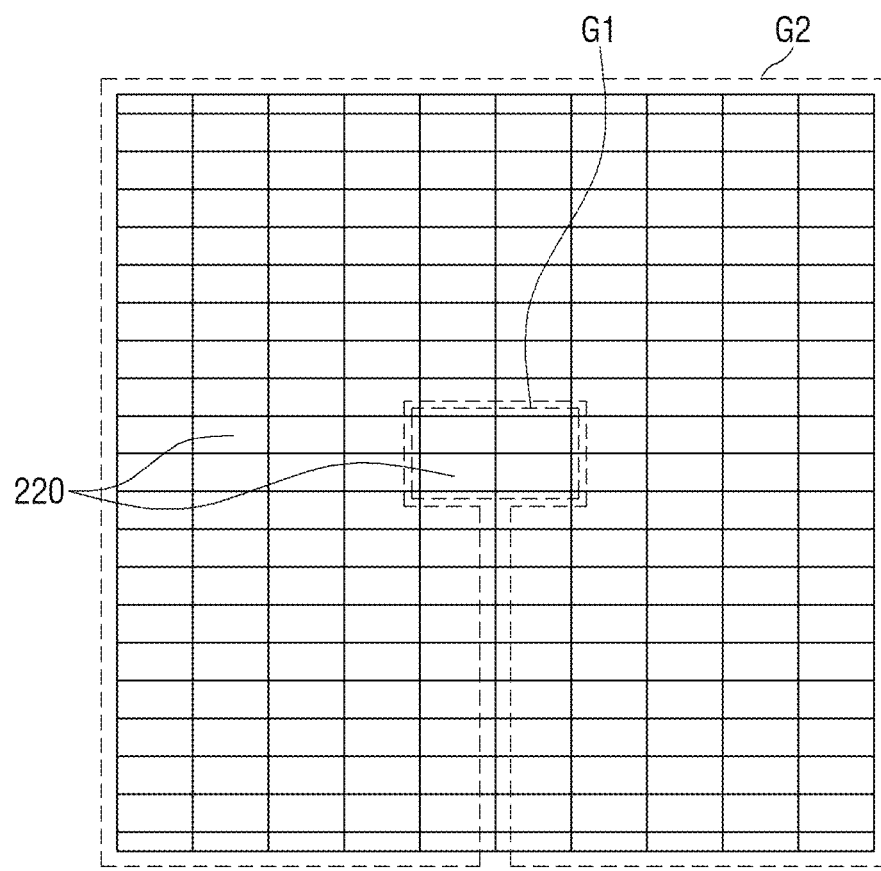
FIG. 7 is a schematic diagram showing a plurality of exit lenses according to an exemplary embodiment of the present disclosure.

In general, the plurality of exit lenses 220 may allow the light beams to exit in the front-and-rear direction. In this case, the light irradiation patterns of the light beams exiting from the plurality of exit lenses 220 may be misaligned from one another due to the difference between the positions of the plurality of exit lenses 220. Thus, according to an exemplary embodiment of the present disclosure, as shown in FIG. 7, an exit lens belonging to a first group G1 among the plurality of exit lenses 220 may allow the light to exit therefrom in a first direction, while an exit lens belonging to a second group G2 may allow the light to exit therefrom in a second direction, which is tilted by a predetermined angle with respect to the first direction. Thus, the light irradiation patterns of the light beams exiting from the plurality of exit lenses 220 may be superposed on one another so as not to be misaligned from one another.

In this regard, it is preferable that one of the plurality of exit lenses 220 is included in the first group G1 because a difference may occur between the positions of the exit lenses adjacent to each other. However, even when the light beams exit, in the front-and-rear direction, from at least two exit lenses adjacent to each other among the plurality of exit lenses 220, there is little influence on the sharpness or brightness of the light irradiation pattern formed by the lamp 1 for the vehicle according to the present disclosure. In this case, the at least two exit lenses adjacent to each other may be included in the first group G1.

FIG. 7 shows an example where the first group G1 includes several exit lenses adjacent to one another and arranged on a central region among the plurality of exit lenses 220, and the second group G2 is disposed around the first group G1. However, the present disclosure is not limited thereto. A position of the first group G1 or the number of exit lenses included in the first group G1 may vary depending on a position of the light irradiation pattern formed by the lamp 1 for the vehicle according to the present disclosure. Further, depending on the location of the first group G1, the location of the second group G2 may vary.

In an exemplary embodiment of the present disclosure, an example in which the first direction is the front-and-rear direction, while the second direction is a direction tilted by a predetermined angle with respect to the front-and-rear direction is described. However, this is only an example to help understanding the present disclosure. The disclosure is not limited thereto, and the first direction may mean a reference direction, and the second direction may refer to a direction tilted by a predetermined angle with respect to the first direction. The second direction may include at least two directions respectively tilted by at least two predetermined angles with respect to the first direction.

Figure 8:
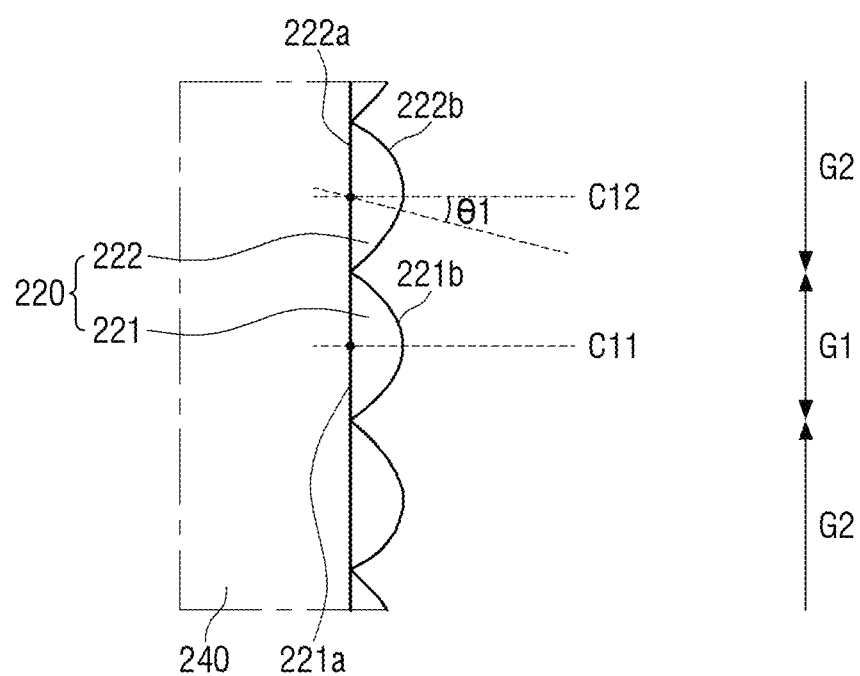
FIG. 8 is a schematic diagram showing an optical system according to an exemplary embodiment of the present disclosure.

FIG. 8 is a schematic diagram illustrating an optical system according to an exemplary embodiment of the present disclosure. FIG. 8 is an example where a single exit lens is included in the first group G1 for convenience of description. Referring to FIG. 8, in the optical system 200 according to an exemplary embodiment of the present disclosure, both sides of an exit surface 221b of a first exit lens 221 belonging to the first group G1 may be symmetrical with respect to a reference line C11 that passes through a center of an incident surface 221a thereof in the front-and-rear direction. Both sides (e.g., upper half and lower half) of an exit surface 222b of a second exit lens 222 belonging to the second group G2 may be asymmetrical with respect to a reference line C12 that passes through a center of an incident surface 222a in the front-and-rear direction.

Herein, the first exit lens 221 may collectively refer to the exit lenses belonging to the first group G1. The second exit lens 222 may collectively refer to exit lenses belonging to the second group G2. Angles between the front-and-rear direction and directions in which the light beams respectively exit from the second exit lenses 222 may vary based on the distance between the first exit lens 221 and the second exit lenses 222.

The configuration that both sides of the exit surface 222b of the second exit lens 222 belonging to the second group G2 are asymmetrical with respect to the reference line C12 that passes through a center of the incident surface 222a in the front-and-rear direction may allow the light beam exiting from the second exit lens 222 to be tilted by a predetermined angle θ1 relative to the front-and-rear direction.

In other words, the second exit lens 222 may be formed so that both sides (e.g., upper half and lower half) of the exit surface 222b thereof with respect to the reference line C12 have different curvatures. As a result, the direction in which the light beam exits from the second exit lens 222 may be tilted by a predetermined angle θ1 relative to the front-and-rear direction and may be tilted toward the first group G1.

Figure 9:
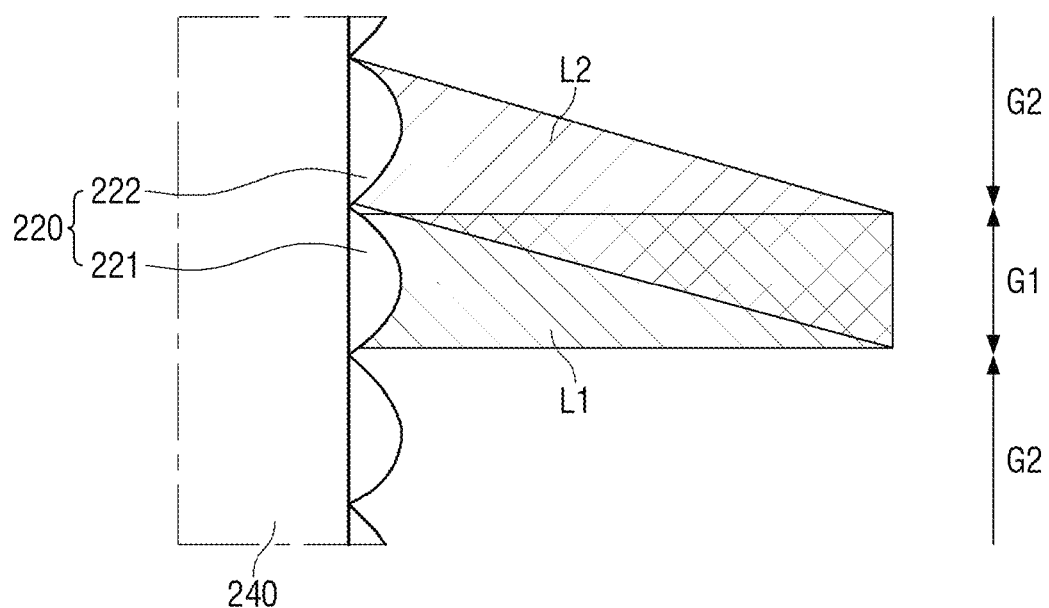
FIG. 9 is a schematic diagram showing a direction in which a light beam exits through the optical system of FIG. 8.

FIG. 8 shows an example where an exit surface 242 of the second optical member 240 on which the plurality of exit lenses 220 are formed has a planar shape that is generally perpendicular to the front-and-rear direction. In this case, a line passing through a center of the incident surface of each of the plurality of exit lenses 220 may be parallel to a normal direction perpendicular to a plane on which the plurality of exit lenses 220 are formed. Both sides of the exit surface of the exit lens included in the second group G2 may be asymmetrical around the line passing through the center of the incident surface in the perpendicular direction. Thus, the light beam exiting from the second exit lens 222 may be tilted by a predetermined angle θ1 relative to the front-and-rear direction. As shown in FIG. 9, a light beam L2 exiting from the second exit lens 222 may be tilted by a predetermined angle relative to a direction of light L1 exiting from the first exit lens 221 and may be tilted toward the first exit lens 221. Thus, the light irradiation patterns respectively formed by the first exit lens 221 and the second exit lens 222 may be superposed on each other without misalignment therebetween.

In FIGS. 8 and 9 as described above, the exit surface of the exit lens belonging to the second group G2 among the plurality of exit lenses 220 may be formed to be vertically asymmetrical with respect to the reference line passing through the center of the incident surface in the front-and-rear direction. However, the present disclosure is not limited thereto. Depending on a location where the light irradiation pattern is formed, the exit surface of the exit lens belonging to the second group G2 may be asymmetrically formed in directions other than the vertical direction such as up-and-down directions, left-and-right directions, and diagonal directions.

FIGS. 8 and 9 describe a case in which the exit surface 242 of the second optical member 240 on which the plurality of exit lenses 220 are formed has a generally planar shape. However, the present disclosure is not limited thereto. The surfaces on which the plurality of exit lenses 220 are respectively formed may have different inclination angles, based on the directions in which the light beams respectively exit from the plurality of exit lenses 220.

Figure 10:
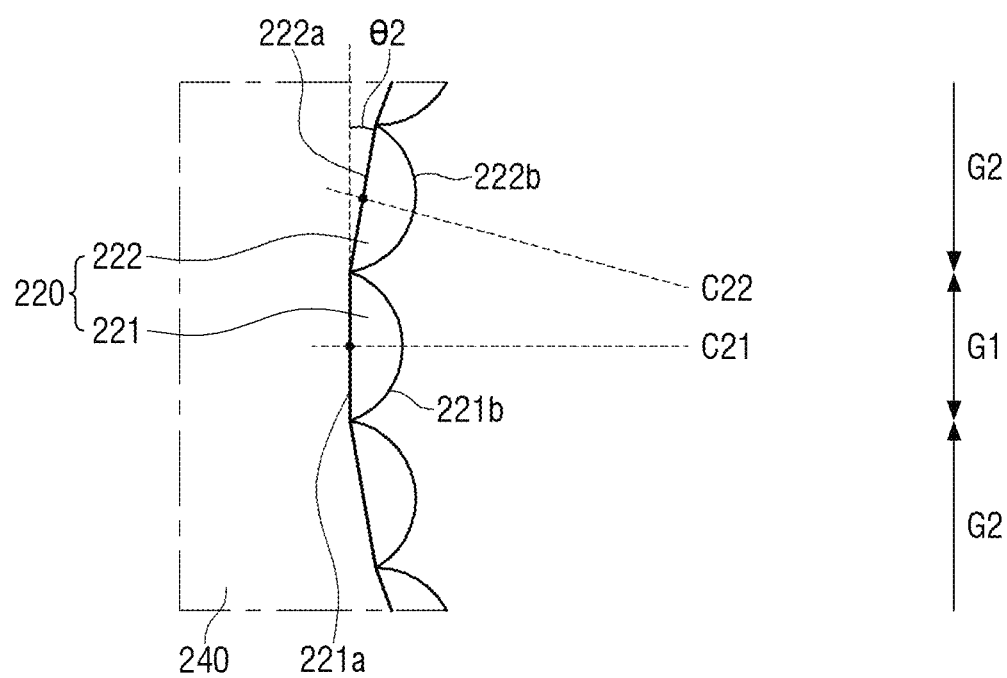
FIG. 10 is a schematic diagram showing an optical system according to another exemplary embodiment of the present disclosure.

FIG. 10 is a schematic diagram showing an optical system according to another exemplary embodiment of the present disclosure. FIG. 10 shows an example of a case where a single exit lens is included in the first group G1 for convenience of description. Referring to FIG. 10, the optical system 200 according to another exemplary embodiment of the present disclosure may be formed so that surfaces on which the plurality of exit lenses 220 are respectively formed have different inclination angles, based on directions in which the light beams respectively exit from the plurality of exit lenses 220.

For example, a first surface on which a first exit lens 221 belonging to the first group G1 among the plurality of exit lenses 220 is formed may have a planar shape perpendicular to the front-and-rear direction. A second surface on which a second exit lens 222 belonging to the second group G2 is formed may be formed to be tilted by a predetermined angle θ2 with respect to the first surface on which the first exit lens 221 is formed.

In this regard, the configuration that the second surface on which the second exit lens 222 is formed is tilted by a predetermined angle θ2 with respect to the first surface on which the first exit lens 221 is formed may ensure that the light irradiation patterns respectively formed by the first exit lens 221 and the second exit lens 222 may be superposed on each other, and not be misaligned from each other.

The configuration that the surfaces on which the plurality of exit lenses 220 are respectively formed have different tilting angles, based on the directions in which the light beams respectively exit from the plurality of exit lenses 220 may ensure that the direction in which the light beam exits may be tilted while the exit surface of each exit lens is formed symmetrically with respect to the reference line passing through the center of the incident surface in a direction perpendicular to the surface on which each of the plurality of exit lenses 220 is formed.

In other words, both sides (e.g., upper half and lower half) of the exit surface 221b may be symmetrical with respect to the reference line C21 passing through the center of the incident surface 221a of the first exit lens 221 in the direction perpendicular to the first surface where the first exit lens 221 belonging to the first group G1 among the plurality of exit lenses 220 is formed. Similarly, both sides of the exit surface 222b may be formed to be symmetrical with respect to the reference line C22 passing through the center of the incident surface 222a of the second exit lens 222 in the direction perpendicular to the second surface where the second exit lens 222 belonging to the second group G2 is formed. However, directions in which the first and second light beams exit respectively from the first exit lens 221 and the second exit lens 222 may be different from each other.

Figure 11:
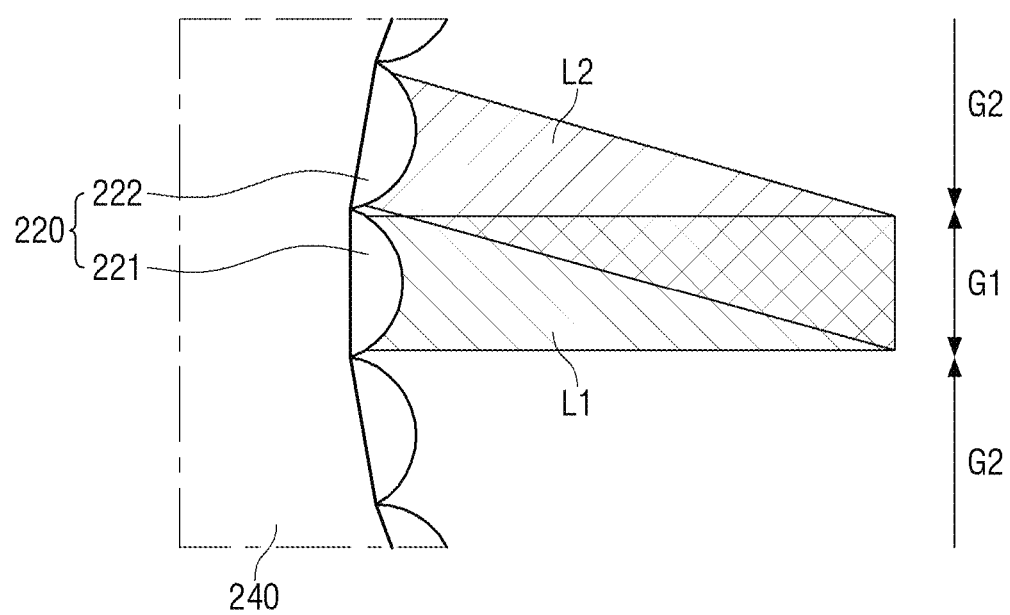
FIG. 11 is a schematic diagram showing a direction in which a light beam exits through the optical system of FIG. 10.

In other words, when the surfaces on which the plurality of exit lenses 220 are respectively formed have different tilting angles, in accordance with the directions in which the light beams exit respectively from the plurality of exit lenses 220, the light beam L2 that exits from the second exit lens 222 may be tilted by a predetermined angle relative to the light beam L1 that exits from the first exit lens 221 and toward the first exit lens 221, as shown in FIG. 11. Accordingly, the light irradiation patterns respectively formed by the first exit lens 221 and the second exit lens 222 may be superposed on each other in a similar manner as FIG. 9.

As described above, in the lamp 1 for the vehicle according to the present disclosure, the light output direction from the exit lens belonging to the second group G2 among the plurality of exit lenses 220 may be tilted by a predetermined angle with respect to the front-and-rear direction. Thus, even when differences are present between the positions of the plurality of exit lenses 220, the light irradiation patterns respectively formed by the plurality of exit lenses 220 may be prevented from being misaligned from one another and may be superposed on one another. Thus, the sharpness of the light irradiation pattern formed by the lamp 1 for the vehicle according to the present disclosure may be improved, and the uniform brightness may be achieved.

Figure 12:
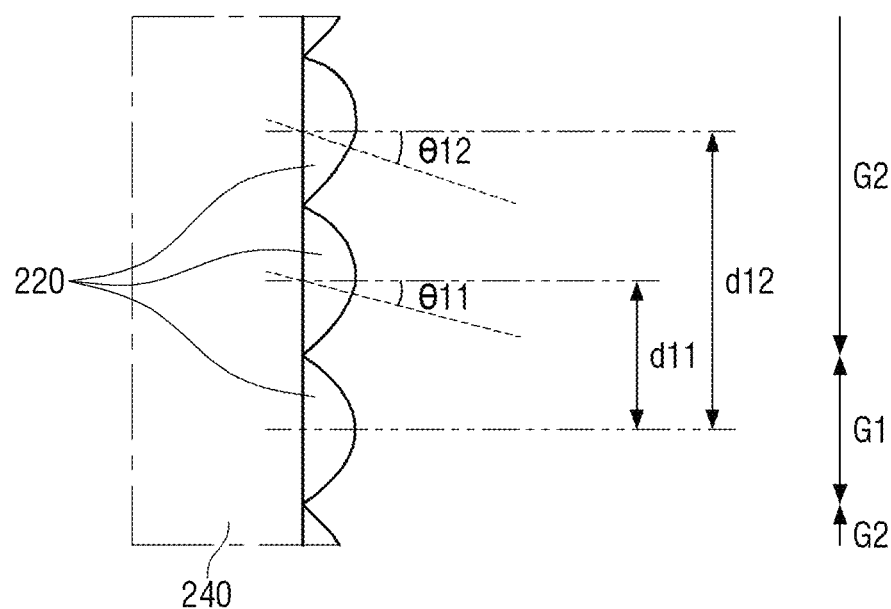
FIG. 12 is a schematic diagram showing a curvature of an exit surface per each position of each exit lens according to an exemplary embodiment of the present disclosure.

In some embodiments, the exit lenses belonging to the second group G2 may be constructed such that the light output directions therefrom may vary based on distances between the exit lens belonging to the first group G1 and the exit lenses belonging to the second group G2. FIG. 12 is a schematic diagram showing a curvature of an exit surface that varies based on a position of each exit lens according to an exemplary embodiment of the present disclosure. FIG. 12 shows an example in which a surface on which the plurality of exit lenses 220 are formed has a plane shape that is generally perpendicular to the front-and-rear direction, as shown in FIG. 8 above.

Referring to FIG. 12, a first exit lens belonging to the second group G2 may have a first distance d11 from an exit lens belonging to the first group G1. A second exit lens belonging to the second group G2 may be a second distance d12 from the exit lens belonging to the first group G1. The second distance d12 may be greater than the first distance d11. In this case, a tilt angle θ12 at which the light beam exits from the second exit lens may be formed to be greater than a tilt angle θ11 at which the light beam exits from the first exit lens. This is because as the distance from the first group G1 increases, the light needs to exit at a greater tilt angle in order to superpose the light irradiation patterns on one another.

In this regard, the exit lenses belonging to the second group G2 may have the exit surfaces having different curvatures, depending on the distances from an exit lens belonging to the first group G1, so that the tilt angles at which the light beams respectively exit therefrom may be different from one another.

In the above exemplary embodiment, the description is given for an example in which the exit lenses belonging to the second group G2 are arranged and spaced from the first group G1 in the vertical direction. However, this is only an example to help understanding the present disclosure. The present disclosure is not limited thereto, and a similar principle of the present disclosure may be applied to an embodiment in which the exit lenses belonging to the second group G2 are arranged and spaced from the first group G1 in other directions, such as the horizontal or diagonal directions.

Figure 13:
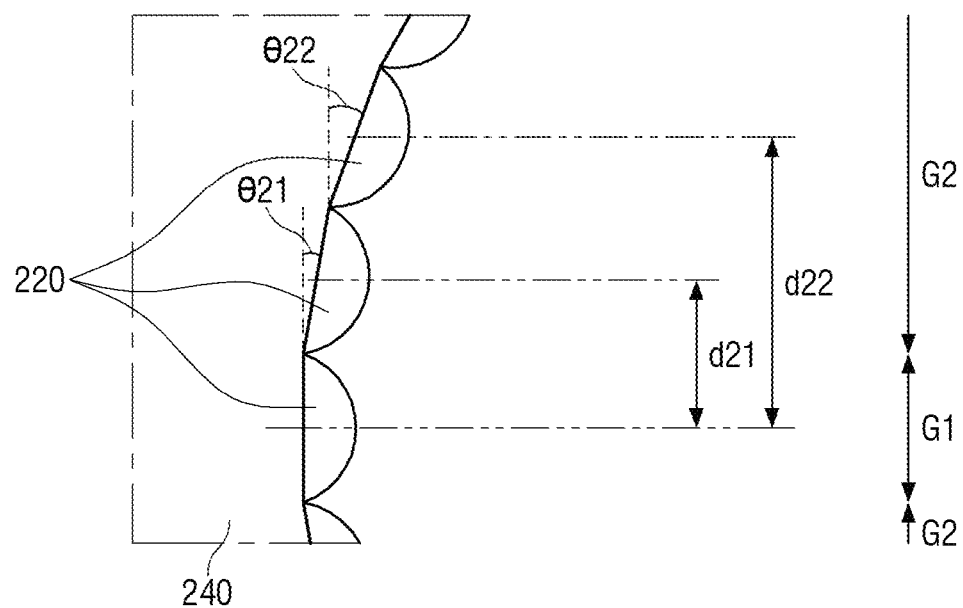
FIG. 13 is a schematic diagram showing a tilt angle of a plane where each exit lens is disposed per each position of each exit lens according to an exemplary embodiment of the present disclosure.

FIG. 13 is a schematic diagram showing that a tilt angle of a surface where each exit lens is formed varies based on a position of each exit lens according to another exemplary embodiment of the present disclosure. FIG. 13 shows an example in which the surfaces on which the plurality of exit lenses 220 are respectively formed have different inclination angles, in accordance with the directions in which the light beams respectively exit from the plurality of exit lenses 220, as shown in FIG. 10 above.

Referring to FIG. 13, an angle at which a surface on which the exit lens belonging to the second group G2 is formed may be tilted with respect to a surface where the exit lens belonging to the first group G1 is formed, and the angle may increase as the distance of the corresponding exit lens to the exit lens belonging to the first group G1 increases.

For example, a first exit lens belonging to the second group G2 may have a first distance d21 from an exit lens belonging to the first group G1. A second exit lens belonging to the second group G2 may have a second distance d22 from the exit lens belonging to the first group G1. The second distance d22 may be greater than the first distance d21. In this case, a tilt angle θ22 at which the light beam exits from the second exit lens may be greater than a tilt angle θ21 at which the light beam exits from the first exit lens. Thus, as the distance from the first group G1 increases, the light may exit at a greater tilt angle in order to superpose the light irradiation patterns on one another.

As described above, in the lamp 1 for the vehicle according to the present disclosure, when the light irradiation patterns are formed by the light beams exiting through the plurality of exit lenses 220, the output directions of light from the plurality of exit lenses 220 may vary based on the positions of the plurality of exit lenses 220 to allow the light irradiation patterns respectively formed by the plurality of exit lenses 220 to be prevented from being misaligned from one another, but to be superposed on one another. Thus, the sharpness of the light irradiation pattern formed by the lamp 1 for the vehicle according to the present disclosure may be improved, and the uniform brightness may be achieved.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle, the lamp comprising:
a light source system; and
an optical system to allow light emitted from the light source system to be incident to the optical system through a plurality of incident lenses and to exit through a plurality of exit lenses that correspond to the plurality of incident lenses,
wherein the optical system comprises:
a first optical member having an incident surface that receives the light from the light source system, wherein the plurality of incident lenses are arranged on the incident surface; and
a second optical member having an exit surface from which the light incident from the first optical member exits, wherein the plurality of exit lenses are arranged on the exit surface, and
wherein the plurality of exit lenses include:
a first exit lens configured to output light therefrom in a first direction; and
a second exit lens configured to output light therefrom in a second direction that is tilted by a predetermined angle with respect to the first direction.

2. The lamp of claim 1, wherein the first exit lens is arranged at a central region among the plurality of exit lenses, and
wherein a direction in which light exits from the second exit lens is tilted toward the first exit lens.

3. The lamp of claim 1, wherein the light source system comprises:
a light source; and
an optical path adjustment member for adjusting a path of the light emitted from the light source,
wherein the optical path adjustment member adjusts the path of the light to cause the light emitted from the light source system to be substantially parallel to an optical axis of the light source.

4. The lamp of claim 3, wherein the optical path adjustment member includes at least one of an aspherical lens, a total internal reflection (TIR) lens, a reflector, or a Fresnel lens.

5. A lamp for a vehicle, the lamp comprising:
a light source system; and
an optical system to allow light emitted from the light source system to be incident to the optical system through a plurality of incident lenses and to exit through a plurality of exit lenses that correspond to the plurality of incident lenses,
wherein the optical system comprises:
a first optical member having an incident surface that receives the light from the light source system, wherein the plurality of incident lenses are arranged on the incident surface; and a second optical member having an exit surface from which the light incident from the first optical member exits, wherein the plurality of exit lenses are arranged on the exit surface, wherein the plurality of exit lenses include:
a first exit lens configured to output light therefrom in a first direction; and
a second exit lens configured to output light therefrom in a second direction that is tilted by a predetermined angle with respect to the first direction, and wherein the exit surface of the second optical member is formed in a planar shape.

6. The lamp of claim 5, wherein an exit surface of the first exit lens is symmetrical with respect to a reference line that passes through a center of an incident surface of the first exit lens in a direction perpendicular to the exit surface of the second optical member, and wherein an exit surface of the second exit lens is asymmetrical with respect to a reference line that passes through a center of an incident surface of the second exit lens in the direction perpendicular to the exit surface of the second optical member.

7. The lamp of claim 6, wherein the second exit lens includes a plurality of second exit lenses, wherein exit surfaces of the plurality of second exit lenses have different curvatures, which vary based on distances between the plurality of second exit lenses and the first exit lens.

8. The lamp of claim 5, wherein the first exit lens is arranged at a central region among the plurality of exit lenses, and wherein a direction in which light exits from the second exit lens is tilted toward the first exit lens.

9. The lamp of claim 5, wherein the light source system comprises:
a light source; and
an optical path adjustment member for adjusting a path of the light emitted from the light source,
wherein the optical path adjustment member adjusts the path of the light to cause the light emitted from the light source system to be substantially parallel to an optical axis of the light source.

10. The lamp of claim 9, wherein the optical path adjustment member includes at least one of an aspherical lens, a total internal reflection (TIR) lens, a reflector, or a Fresnel lens.

11. A lamp for a vehicle, the lamp comprising:
a light source system; and
an optical system to allow light emitted from the light source system to be incident to the optical system through a plurality of incident lenses and to exit through a plurality of exit lenses that correspond to the plurality of incident lenses, wherein the optical system comprises:
a first optical member having an incident surface that receives the light from the light source system, wherein the plurality of incident lenses are arranged on the incident surface; and
a second optical member having an exit surface from which the light incident from the first optical member exits, wherein the plurality of exit lenses are arranged on the exit surface, wherein the plurality of exit lenses include:
a first exit lens configured to output light therefrom in a first direction; and
a second exit lens configured to output light therefrom in a second direction that is tilted by a predetermined angle with respect to the first direction, and wherein the exit surface of the second optical member has a first surface on which the first exit lens is formed, and a second surface on which the second exit lens is formed, wherein the second surface is tilted by a predetermined angle with respect to the first surface.

12. The lamp of claim 11, wherein an exit surface of the first exit lens is symmetrical with respect to a reference line that passes through a center of an incident surface of the first exit lens in a direction perpendicular to the exit surface of the second optical member, and wherein an exit surface of the second exit lens is symmetrical with respect to a reference line that passes through a center of an incident surface of the second exit lens in the direction perpendicular to the exit surface of the second optical member.

13. The lamp of claim 11, wherein the second exit lens includes a plurality of second exit lenses, wherein the exit surface of the second optical member has a plurality of surfaces on which the plurality of the second exit lenses are respectively formed, wherein the plurality of surfaces have different tilt angles with respect to the first surface, the different tilt angles varying based on distances between the plurality of second exit lenses and the first exit lens.

14. The lamp of claim 11, wherein the first exit lens is arranged at a central region among the plurality of exit lenses, and wherein a direction in which light exits from the second exit lens is tilted toward the first exit lens.

15. The lamp of claim 11, wherein the light source system comprises:
a light source; and
an optical path adjustment member for adjusting a path of the light emitted from the light source,
wherein the optical path adjustment member adjusts the path of the light to cause the light emitted from the light source system to be substantially parallel to an optical axis of the light source.

16. The lamp of claim 15, wherein the optical path adjustment member includes at least one of an aspherical lens, a total internal reflection (TIR) lens, a reflector, or a Fresnel lens.

* * * * *